(12) United States Patent
Reyes Vermot et al.

(10) Patent No.: US 12,728,989 B2
(45) Date of Patent: Sep. 8, 2026

(54) ATTACHMENT SYSTEM FOR LANDING GEAR

(71) Applicants: Airbus Operations SAS, Toulouse (FR); Airbus Operations Limited

(72) Inventors: Sébastien Reyes Vermot, Filton (GB); Fraser Wilson, Filton (GB); Johan Dentesano, Toulouse (FR)

(73) Assignees: Airbus Operations SAS, Toulouse (FR); Airbus Operations Limited, Filton Bristol (GB)

( * ) Notice: Subject to any disclaimer, the term of this patent is extended or adjusted under 35 U.S.C. 154(b) by 0 days.

(21) Appl. No.: 18/961,555

(22) Filed: Nov. 27, 2024

(65) Prior Publication Data

US 2025/0171136 A1 May 29, 2025

(30) Foreign Application Priority Data

Nov. 28, 2023 (GB) ...................................... 2318161

(51) Int. Cl.
*B64C 25/10* (2006.01)

(52) U.S. Cl.
CPC .................................... *B64C 25/10* (2013.01)

(58) Field of Classification Search
CPC ....... B64C 25/02–30; Y10T 403/32951; Y10T 403/32967
See application file for complete search history.

(56) References Cited

U.S. PATENT DOCUMENTS 7,344,108 B2 3/2008 Muylaert et al.
9,981,737 B2 5/2018 Remond et al.
2013/0048783 A1* 2/2013 Ekmedzic ............... B64C 25/04 244/102 R
2021/0253220 A1* 8/2021 Clark ........................ B32B 7/12
2023/0027644 A1* 1/2023 Orr ........................... B64C 1/14
2023/0278701 A1* 9/2023 Brand ..................... B64C 25/36 244/103 R

FOREIGN PATENT DOCUMENTS

BR 102013032347 A2 12/2015
CN 104802984 A * 7/2015
CN 104802984 B 11/2018
RU 836942 A1 1/1996

OTHER PUBLICATIONS

European Search Report for corresponding European Patent Application No. 24215461.5 dated Mar. 6, 2025.
United Kingdom Search Report for corresponding United Kingdom Patent Application No. 2318161.3 dated May 3, 2024.

* cited by examiner

*Primary Examiner* — Ashesh Dangol
(74) *Attorney, Agent, or Firm* — Greer, Burns & Crain, Ltd.

(57) ABSTRACT

An attachment system for installing a landing gear into a landing gear bay of an aircraft. The attachment system comprises an attachment element configured to be attachable to the landing gear; and a receiving element configured to receive the attachment element and secure the landing gear within the landing gear bay. The receiving element is configured such that the attachment element is insertable into the receiving element from an installation direction, and the attachment element is configured to receive, in the installation direction, a fastener to fasten the attachment element to the receiving element.

21 Claims, 10 Drawing Sheets

ATTACHMENT SYSTEM FOR LANDING GEAR

CROSS-REFERENCES TO RELATED APPLICATIONS

This application claims the benefit of Great Britain Patent Application Number 2318161.3 filed on Nov. 28, 2023, the entire disclosure of which is incorporated herein by way of reference.

FIELD OF THE INVENTION

The present invention relates to landing gears for aircraft, and more specifically to systems for installation of landing gears into a landing gear bay of an aircraft.

BACKGROUND OF THE INVENTION

The installation of aircraft landing gears into a landing gear bay can be a complex and time-consuming process in which the landing gear is aligned and fastened to internal structures of the landing gear bay. The installation of the landing gear typically requires multiple and often iterated operations to ensure proper alignment with the aircraft body, and can also include dismantling and reconstructing of various components of the landing gear. It is desirable to improve the installation of aircraft landing gears.

SUMMARY OF THE INVENTION

A first aspect of the present invention provides an attachment system for installing a landing gear into a landing gear bay of an aircraft. The attachment system comprises an attachment element configured to be attachable to a pivot pin of the landing gear, and a receiving element configured to receive the attachment element when attached to the pivot pin and to secure the landing gear within the landing gear bay. The pivot pin is configured to form a rotational coupling between the landing gear and the attachment element, and the receiving element is configured such that the attachment element is insertable into the receiving element from an installation direction when attached to the pivot pin. The attachment element is further configured to receive, in the installation direction, a fastener to fasten the attachment element to the receiving element.

It is an insight of the inventors to recognize an installation direction, which can be considered a general direction in which the landing gear is moved into a landing gear bay during an installation process, and to develop an attachment system which is aligned with this installation direction. Typically, the landing gear bay is oriented downwards in that it is facing towards the ground during the assembly process of the aircraft, and the landing gear is therefore typically lifted vertically into the landing gear bay during installation. By allowing the attachment element to be inserted into the receiving element in the installation direction, the attachment system is readily operable at the installation stage and the need for further operations and reorientations to engage the attachment element with the receiving element can therefore be avoided.

Furthermore, because the attachment element is configured to receive the fastener in the installation direction, the attachment element can be fastened to the receiving element in a relatively straightforward manner. For example, the landing gear can be lifted into the landing gear bay in the installation direction, the attachment element inserted into the receiving element in the installation direction, and the attachment element fastened to the receiving element in the installation direction. Thus, the installation operations as described above can be performed from the same direction. This can prevent an engineer, or tools used in the installation process, from needing to reorient themselves during the installation process, which can improve installation speed. Furthermore, it can reduce a risk of unwanted movement of the landing gear relative to the landing gear bay which might result from such movement of engineer or tools, thereby improving the reliability of the installation process and further decrease time taken to perform the installation process.

The attachment system can be contrasted from previous methods or systems for installing landing gears, in which the landing gear is lifted into the landing gear bay and then attached to structures of landing gear bay by fasteners provided perpendicular to the installation direction, for example, which can require an operator to reposition, and/or require disassembly and subsequent reassembly of components such as pintles, bearing inserts, and receiving brackets to install the landing gear. Rather, lifting of the landing gear into the landing gear bay, engagement of the receiving element with the attachment element, and fastening of the receiving element to the attachment element can occur in one relatively continuous stage, all occurring in the installation direction.

As used herein, a landing gear can be understood as an undercarriage of the aircraft, for example, and which facilitates movement along the floor when the aircraft is on the ground. As used herein, a landing gear bay can be understood as a cavity provided in an aircraft fuselage, into which the landing gear can be stowed during flight. As used herein, a pivot pin can be understood as a pintle pin or a trunnion, for example, which allows for rotational movement during extraction and retraction of the landing gear, for example when a landing gear is being deployed or stowed into the landing gear bay. As used herein, the receiving element and attachment element can be understood to be, respectively, a bracket, or a recess, or a mousehole, or a cut-out, as appropriate, and the attachment element can be understood as an insert, insertable to the receiving element. As used herein, a fastener can be understood as a device which mechanically affixes, or joins, two or more objects together. For example, a fastener can be understood to comprise any one or more of nuts, bolts, screws, clips, ties, anchors, latches, clasps, staples, retainers, and rivets.

Optionally, the attachment element may comprise a shape and the receiving element a corresponding, or complementary shape, wherein the shapes may contribute to ease of installation by, for example, aiding self-alignment of the receiving element and the attachment element during insertion, or contribute to distribution of loads, or forces, between the receiving element and the attachment element, or both.

Accordingly, the attachment element may in some examples comprise a tapered portion configured to be insertable into a correspondingly drafted portion of the receiving element. A tapered portion can refer to a portion comprising a first width at a first distance along an axis, and a second width at a second distance along the axis, the first width being different to the second width. The tapered portion may be chamfered, or beveled, for example. The tapered portion may be a wedge shaped. The presence of a tapered portion of the attachment element and a correspondingly drafted portion of the receiving element can help during insertion of the attachment element into the receiving element. For example, the tapered portion and correspondingly drafted portion can act as a guide such that, during installation, the attachment element is positioned correctly relative to the receiving element. In this sense, the tapered portion and the correspondingly drafted portion can result in self-alignment of the attachment element relative to the receiving element without requiring external assistance from an engineer or tool, for example. Substantially all of the attachment element may be considered tapered, or only a discrete portion of the attachment element may be considered tapered.

Accordingly, in some examples, the attachment element comprises a curved portion and the receiving element comprises a correspondingly curved portion. A curved portion can allow for forces experienced by the attachment element to be readily and evenly transferred to the receiving element, for example. An even transfer of force can reduce a risk that a portion of the receiving element and/or attachment element fails due to excessive loads, for example, and can accordingly improve a lifespan of the receiving element and/or attachment element. Substantially all of the attachment element may be considered curved, or only a discrete portion of the attachment element may be considered curved.

Accordingly, in some examples, the curved portion of the attachment element is semicircular. In other examples, the curved portion may comprise a major or minor segment of a circle, such that a curved exterior of the attachment element is an arc of a circle. In other examples, the curved portion may be a major minor segment of an ellipse, such that a curved exterior of the attachment element is an arc of an ellipse. In examples, the attachment element may comprise a plurality of curved portions which combined form a composite structure of curved portions, such as a combination of semicircles, for example. A circular shape can allow for improved load transmission of any combination of upward, forward and aft loads originating from the landing gear.

The attachment element may be tapered and curved in different cross-sectional planes, for example. In a first cross-section, the attachment element may have straight sides but nevertheless be tapered. In a second cross-section, such as perpendicular to the first, the attachment element may have curved sides.

Accordingly, in some examples, the attachment element comprises a flange and the receiving element comprises a corresponding groove for receiving the flange, the flange and groove configured to distribute forces between the attachment element and the receiving element. In examples, the flange may be of constant thickness and be disposed around an external surface of the attachment element which interfaces with the receiving element. In other examples, the flange may be provided at a specific portion, or specific portions, of the external surface of the attachment element which interfaces with the receiving element. Similarly, the groove may be provided around an internal surface of the receiving element for interfacing with the exterior surface of the attachment element, whereas in other examples the groove is provided at a specific portion, or specific portions, of the internal surface of the receiving element and corresponding with the location of the flange of the attachment element. In examples, the flange and groove are the tapered portions and/or curved portions of the attachment element and receiving element.

Optionally, the attachment element further comprises a bearing element for receiving the pivot pin of the landing gear. The bearing element can improve the rotational coupling of the pivot pin to the attachment element such that the landing gear can be more easily deployed and retracted, for example. The bearing element may be a bushing, for example.

Optionally, the installation direction extends vertically through an opening of the landing gear bay. The landing gear can thereby be straightforwardly lifted into the landing gear bay, with the landing gear bay oriented in the same direction as it would be during normal operation of the aircraft. This can reduce the need for reorientation of the aircraft during the installation procedure.

Optionally, the receiving element is attachable to a structural element of the landing gear bay. That is, the receiving element is a separate structure to the landing gear bay which can be attached to a structural element of the landing gear bay. This can allow for retrofitting, for example, wherein the receiving element is attachable to a pre-existing landing gear bay and hence the attachment system usable within a pre-existing aircraft.

Optionally, where the receiving element is attachable to a structural element of the landing gear bay, the structural element of the landing gear bay is a side panel of the landing gear bay. In other examples, the attachment may be attachable to a rib or spar, for example.

Optionally, the receiving element comprises a surface for counterboring for fastening the receiving element to the structural element of the landing gear bay. This can allow the receiving element to be positioned relative to the structural element, and once correctly positioned, a hole formed such that a fastener can be received for fastening the receiving element to the structural element of the landing gear bay, for example. This can simplify installation by reducing orientational constraints as the receiving element is more flexibly positioned prior to fastening.

Optionally, the attachment system further comprises a spacing element disposable between the receiving element and the structural element of the landing gear bay. Such a spacing element may be a shim, for example. This can allow for the receiving element to be positioned more accurately relative to the structural element of the landing gear bay, such that the landing gear can accordingly be positioned properly relative to the landing gear bay.

Optionally, the receiving element is formed within a structural element of the landing gear bay. That is, the receiving element may be monolithically integrated within, or otherwise integrated within a volume of, a structural element of the landing gear bay. In examples, the receiving element may be a mousehole, or recess, or cut-out, formed in the structural element of the landing gear bay. This can reduce a spatial footprint of the attachment system because the receiving element is provided within the same volume as a structural element of the landing gear bay, which can reduce space required by the attachment system to be installed into the landing gear bay.

Optionally, where the receiving element is formed within a structural element of the landing gear bay, the structural element is a side panel of the landing gear bay. In other examples, the structural element may be a rib or spar, for example.

Optionally, the attachment system further comprises an aircraft skin portion attachable to the attachment element such that, when the attachment element is received by the receiving element, the aircraft skin portion is coplanar with an exterior skin of the aircraft. The receiving element being formed within a structural element of the landing gear bay may involve removal of a portion of the exterior skin of the aircraft until the landing gear is installed. A corresponding skin portion may be attached, co-planar with the exterior skin, to thereby extend the exterior skin back into this removed portion. This can improve the aerodynamic performance of the exterior skin of the aircraft.

Optionally, the attachment system further comprises a load transfer cap attachable between the aircraft skin portion and the structural element of the landing gear bay and configured to distribute a load between the aircraft skin portion and the structural element of the landing gear bay. This can improve load transfer across the aircraft skin which may reduce a risk of damage of the skin due to excessive loads, for example.

Optionally, two or more of the attachment element, the receiving element, and the structural element of the landing gear bay are each formed of a same material. The same material can mean that the coefficient of thermal expansion is the same for each of the attachment element, the receiving element, and the structural element of the landing gear bay, for example. This can mean that, in response to a change in temperature, such as a change in temperature experienced due to increase or decrease in altitude, each of the attachment element, the receiving element, and the structural element of the landing gear bay may expand or contract by a same proportion. This can reduce a risk of inducing unwanted strains through particular elements of the landing gear bay, for example, and in turn improve an operational lifespan of the attachment system.

Optionally, the attachment system further comprising a retaining element configured to retain the attachment element in an installation orientation relative to the landing gear. This can allow the attachment element to be oriented correctly initially, and retain that position during the installation procedure. For example, an operator could initially align the attachment element relative to the orientation of the receiving element, prior to the landing gear being lifted into the landing gear bay. The retaining element can retain the attachment element in said orientation as the landing gear is lifted into the landing gear bay, such that the attachment element is receivable by the receiving element without requiring further orientational adjustments, or requiring only minor orientational adjustments, for example. In examples, the retainment element may be a spring connected between the attachment element and the landing gear and configured to allow for a degree of motion but nevertheless return the attachment element to a specific orientation relative to the landing gear.

Optionally, when the installation direction extends vertically through an opening of the landing gear bay, the retaining element is a weight disposed in the attachment element and configured to retain the attachment element in a vertical orientation.

Optionally, the attachment system further comprises a guidance element disposable on at least one of the attachment element and retaining element and configured to aid movement of the attachment element along the installation direction such that it can be received by the retaining element. The guidance element may be a temporary element which is provided during the installation process and subsequently removed, for example. The guidance element may be a rod provided on the receiving element and positioned to pass through the fastener receptacle, for example, before being removed and replaced by the fastener once the attachment element has been received by the receiving element. In other examples, it may be a permanent element, but play no further role beyond guiding the attachment element along the installation direction during the installation process. The guidance element may comprise a magnet, or plurality of magnets, and corresponding magnetic surface, for example, distributed between the receiving element and the guidance element, which act to attract the attachment element in a specific direction towards the receiving element and thereby guide the attachment element to being received by the receiving element.

A second aspect of the present invention provides an attachment element for installing a landing gear into a landing gear bay of an aircraft. The attachment element comprises a body configured to be attachable to a pivot pin of the landing gear, the pivot pin forming a rotational coupling between the landing gear and the attachment element, the body further configured to be insertable, in an installation direction, into a receiving element of the landing gear bay; and a receptacle for a fastener for fastening the body to the receiving element; wherein the receptacle is configured to receive the fastener from the installation direction.

A third aspect of the present invention provides a receiving element for installing a landing gear into a landing gear bay of an aircraft. The receiving element comprises a recess configured to receive a body of an attachment element attached to a pivot pin of the landing gear, the recess configured such that the body is insertable into the recess from an installation direction, the receiving element configured to receive a fastener for fastening the attachment element to the receiving element, the receiving element configured to receive the fastener in the installation direction.

It will be appreciated that benefits described previously for the first aspect of the invention are equally applicable to the second and third aspects of the invention where appropriate.

A fourth aspect of the present invention provides an aircraft comprising the attachment system of the first aspect, the attachment element of the second aspect or the receiving element of the third aspect.

In comprising the attachment system, the attachment element, or the receiving element, the landing gear can be more straightforwardly installed and uninstalled. Accordingly, such an aircraft can be manufactured more quickly due to the simplified installation process described above. Additionally or alternatively, it can be more straightforward to perform maintenance on the aircraft and thereby can reduce operational downtime of the aircraft, for example, as the landing gear is more readily removed and reinstalled.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
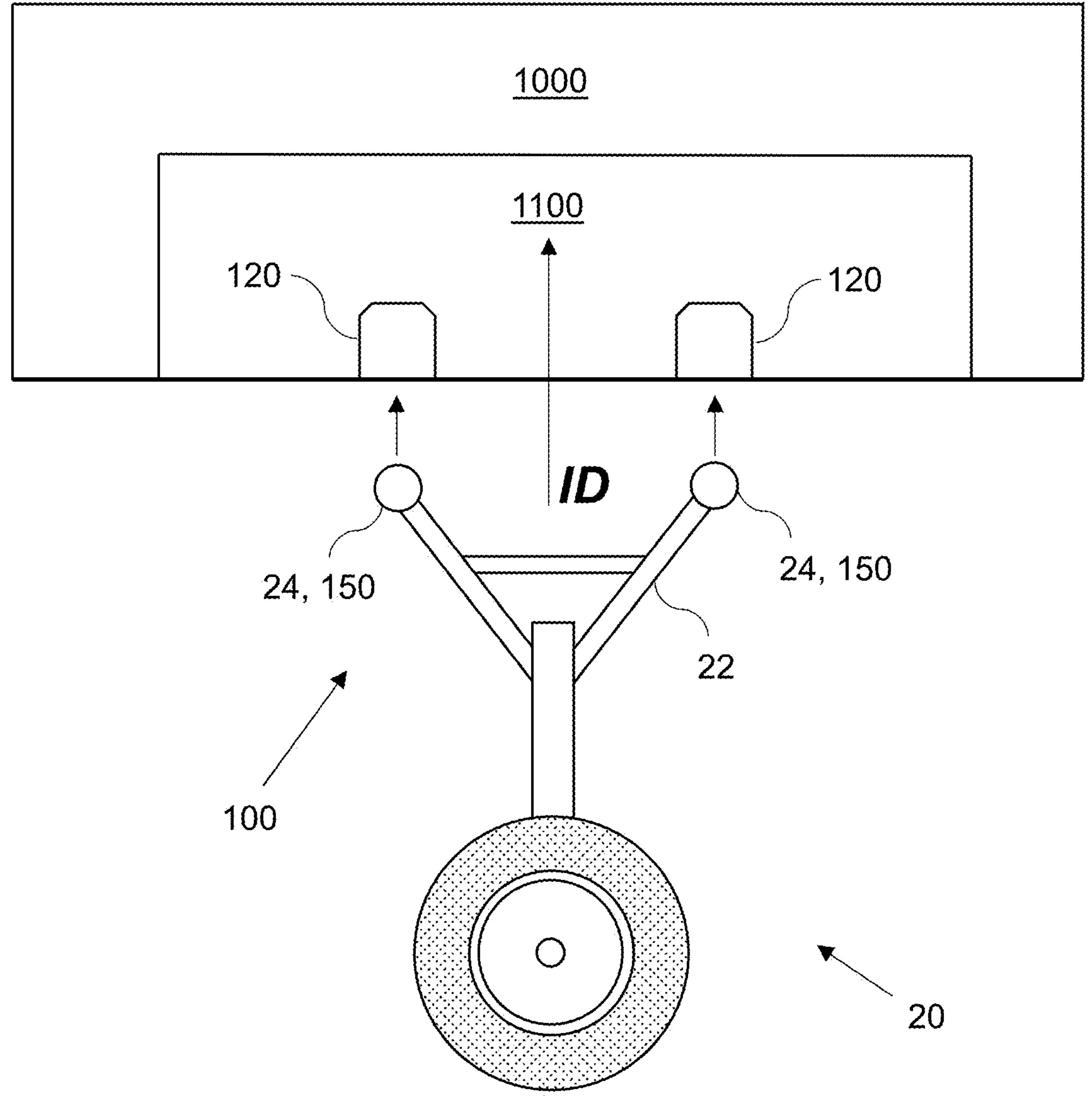
FIG. 1 shows a schematic side-view of an attachment system, according to an embodiment of the present invention.

FIG. 1 schematically illustrates an example of an attachment system 100 according to an embodiment of the present invention.

Considering, first, the general purpose of the attachment system 100: the attachment system 100 is for installing a landing gear 20 into a landing gear bay 1100 of an aircraft 1000. The attachment system 100 comprises an attachment element 150 which is attached to the landing gear 20, and a receiving element 120 which is arranged within the landing gear bay 1100. The landing gear 20 can be installed by lifting the landing gear 20 along an installation direction, labelled in FIG. 1 by the indicative arrow ID, into the landing gear bay 1100. The attachment element 150 is insertable into the receiving element 120, to which it is fastened by a fastener 130 (not illustrated in FIG. 1) to secure the landing gear 20 within the landing gear bay 1100. The receiving element 120 and attachment element 150 are configured such that the insertion of the attachment element 150 to the receiving element 120 is in the installation direction and such that the fastener is received in the installation direction. The attachment element 150 is attached to a pivot pin 24 located at the end of a portion 22 of the landing gear 20, the portion 22 being a part of the landing gear 20 to typically form the attachment point of a landing gear into a landing gear bay, such as a main fitting or a drag stay, for example.

Examples of the attachment element 150 and the receiving element 120 of the attachment system 100 will now be described in more detail.

Figure 2:
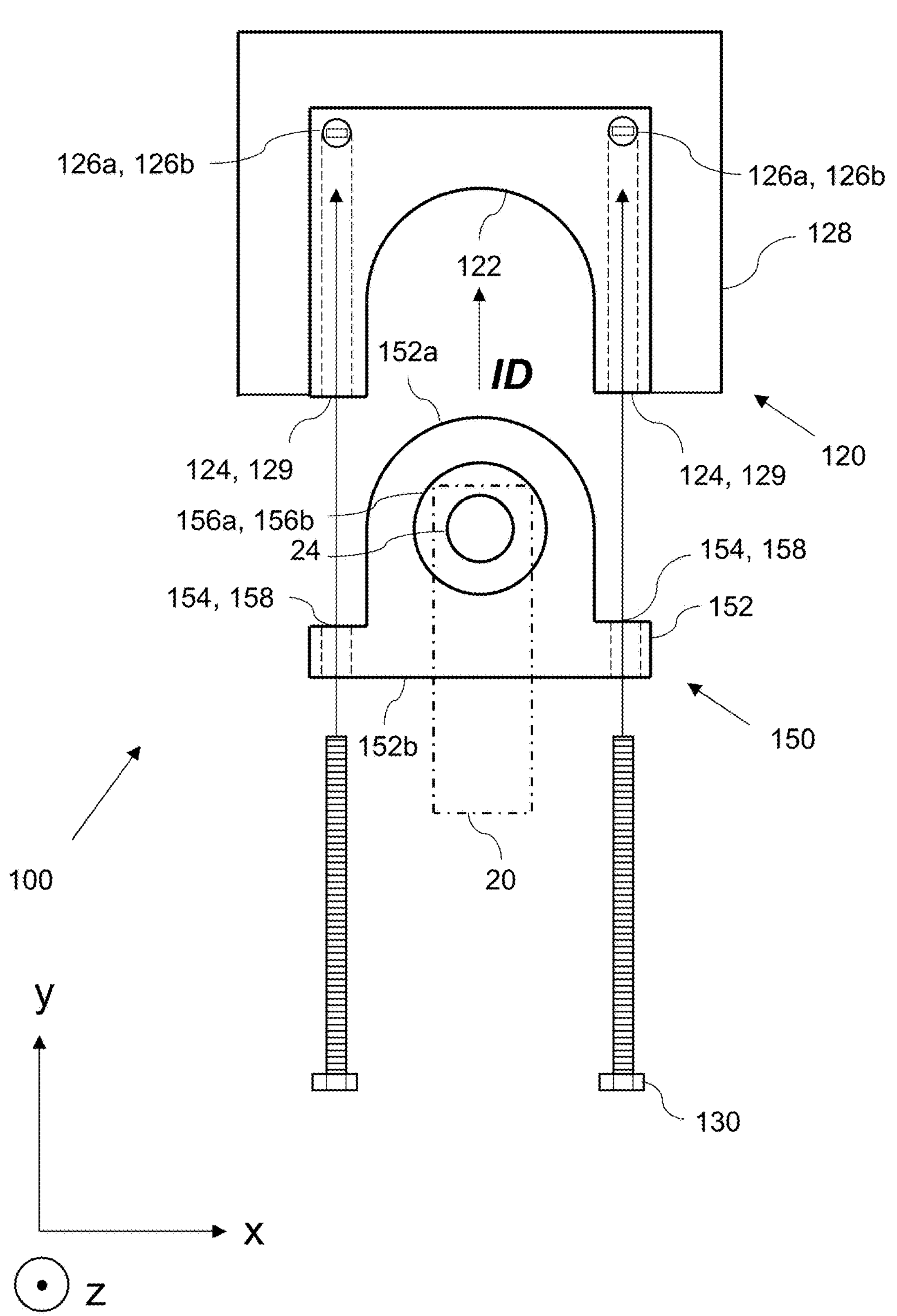
FIG. 2 shows a schematic view of an attachment system in a front-view, according to an embodiment of the present invention.
Figure 3:
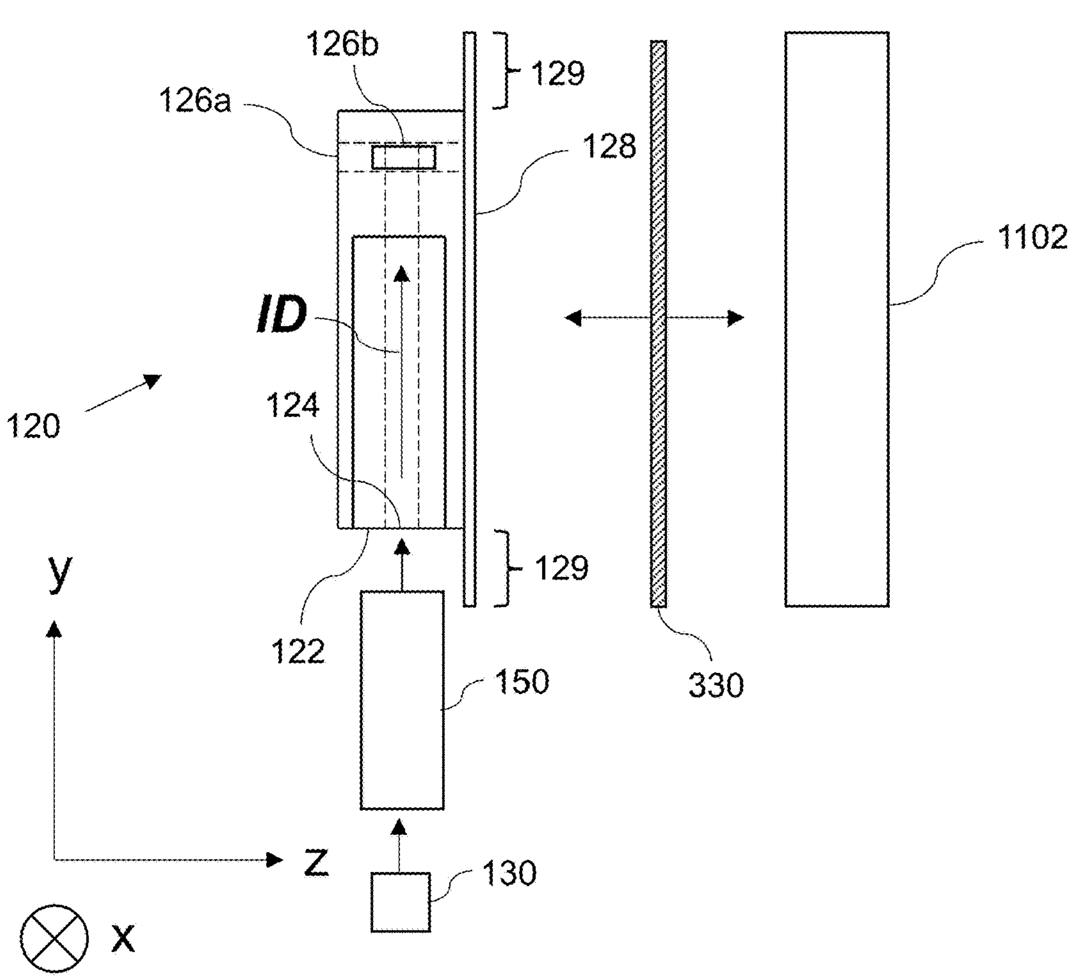
FIG. 3 shows a schematic view of the attachment system in a side-view, according to an embodiment of the present invention.

FIG. 2 illustrates the attachment system 100 in a front-on view according to a first embodiment, and FIG. 3 illustrates the attachment system of the first embodiment in side view. In the first embodiment, the receiving element 120 is a separate element from structures of the landing gear bay 1100, and which can be provided to the landing gear bay 1100 by attachment to those structures, generally designated 1102.

The attachment element 150 comprises a body 152. Generally, the body 152 is a load-bearing structure which is receivable by the receiving element 120, and whose precise shape can vary between examples. The geometry of the body 152 is described relative to the directional axes x, y, z identified in FIG. 2. The y-axis is parallel to the installation direction described in FIG. 1 and so, in the context of a landing gear bay facing downwards, the y-axis is a vertical direction. In this example, the body 152 comprises a head portion 152*a* and a foot portion 152*b*. The head portion 152*a* is above the foot portion 152*b* relative to the y-axis. The geometry of the head portion 152*a* comprises a curved portion, in this example being a semicircular portion, with a radius of curvature in the x-y plane, and a portion comprising straight sides and having constant width, relative to the x-axis. In other words, the head portion 152*a* comprises an external surface which comprises curved and straight-sided portions and which can be considered arch-shaped. The foot portion 152*b* is adjacent to the head portion and connected to the portion of the head portion 152*a* comprising straight sides, such that the semicircular portion forms a distal end of the body 152 relative to the foot portion 152*b*. The foot portion 152*b* has a width, relative to the x-axis, larger than the head portion 152*a* such that it comprises protruding portions 158 which extend either side of the width of the head portion 152*a*.

The receiving element 120 comprises a recess 122. Generally, the recess 122 is for receiving the attachment element 150, and the receiving element 120 is for supporting the load of the attachment element 150 which, in use, comprises the attached landing gear 20. The recess 122 can be considered to be complementary to the body 152 such that a surface of the recess 122 substantially matches an exterior surface of the body 152. In this example, the recess 122 comprises a surface which comprises curved and straight-sided portions and which matches the head portion 152*a* such that, when the head portion 152*a* is inserted within the recess 122 of the receiving element 120, the recess 122 and head portion 152*a* of the body 152 form a continuous interface of contacting surfaces. As seen in FIG. 2, the recess 122 is shaped such that the body 152 is inserted into the recess 122 along the y-direction. In other words, the attachment element 150 is insertable into the receiving element 120 in the installation direction. The receiving element further comprises a horizontal bottom surface 129 in the direction of the x-axis which, when the head portion 152*a* is inserted into and is in contact with the recess 122, contacts the protruding portions 158 of the foot portion 152*b*.

The foot portion 152*b* of the body 152 of the attachment element 150 comprises fastener receptacles 154. In this example, two receptacles 154 are provided, but more generally a single receptacle or a plurality of receptacles may be present for use with a corresponding number of fasteners. The fastener receptacles 154 are through-holes which are aligned in the y-direction, that is, extending from foot portion 152b to head portion 152a of the body 152 in the installation direction. The horizontal bottom surface 129 of the receiving element 120 further comprises fastener receptacles 124. The fastener receptacles 124 of the receiving element are, in this example, cylindrical boreholes which extend vertically through the receiving element 120, in the direction of the y-axis and hence in the installation direction. At a distal end of the fastener receptacles 124 of the receiving element, located away from the horizontal bottom surface 129, barrel nuts 126a are disposed within horizontal boreholes 226b. Fasteners 130, such as a bolt in this example, are insertable through the fastener receptacles 154 of the attachment element 150 and the fastener receptacles 124 of the receiving element 120. When the attachment element 150 is received by the receiving element 120, the fastener 130 is inserted through the fastener receptacles 154 of the attachment element 150 and the fastener receptacles 124 of the receiving element 120 and engages with the barrel nuts 126a located in the horizontal boreholes 226b. The fastener receptacles 154, 124 and contacting surfaces 129, 158 are configured such the fastener 130 is thereby operable to fasten the attachment element 150 to the receiving element 120. More generally than the specific example illustrated here, it will be appreciated that the receiving element 120 and attachment element 150 comprise features, such as contacting surfaces perpendicular to the direction of the fastener, which enable a fastener 130 to secure the receiving element 120 and attachment element 150 together such that their relative movement is prevented, and so the load of the attachment element 150 and attached landing gear 20 can be supported by the receiving element 120.

The landing gear 20 is attached to the attachment element 150 by a pivot pin 24. The pivot pin 24 is disposed at the end of a portion of the landing gear such as a stay or strut, and allows for a rotational coupling between the attachment element 150 and the landing gear 20. In examples, the pivot pin 24 may be considered a trunnion or a pintle, but more generally can be understood to represent a rotational coupling between landing gear 20 and the attachment system 100, the precise form of which may vary between examples. Generally, the pivot pin 24 is received by an aperture 156a, in the body 152 of the attachment element 150. In this example, the aperture 156a comprises a bearing 156b which further improves the rotational coupling of the attachment element 150 to the landing gear 20. In other examples, the pivot pin 24 may itself comprise elements permitting rotational coupling such that the attachment element 150 itself does not require a bearing.

The receiving element 120 in this example further comprises a backplate 128. The backplate is for attachment of the receiving element 120 to a structural element 1102 of the landing gear bay 1100. The backplate 128 extends away from the recess 122 in the x and y plane to increase a surface area of the backplate 128 in contact with the structural element 1102. This can allow loads to be distributed across a greater area of the structural element 1102 of the landing gear bay 1100. Surfaces 129 of the backplate 128 are available for counterboring, such that the backplate 128 and hence receiving element 128 can be fastened to the structural element 1102 of the landing gear bay 1100. In some examples, the backplate 128 may have thicker portions which are specifically designated for counterboring, whereas in other examples all or substantially all of the backplate 128 may be suitable for counterboring. In providing a relatively blank surface for counterboring, the receiving element can first be precisely aligned relative to the structural element 1102 based on the necessary positioning of the landing gear 20 within the landing gear bay 1100, and then the backplate 128 counterbored for fastening to the structural element 1102 once said alignment has occurred. This can allow for a more accurate installation of the landing gear 20.

In other examples, the use of adhesives or alternative fastening mechanisms may be used in addition to or alternatively to fastening the backplate 128 to the structural element 1102. In other examples, the receiving element 120 may not have a backplate 128, but fastening of the receiving element 120 to the structural element 1102 provided by additional fastener receptacles, for example.

In some examples, the attachment system 100 further comprises a spacing element 330 which can be provided between the receiving element and the structural element 1102. The spacing element can aid with aligning the receiving element 120 precisely relative to the structural element 1102 such that the landing gear 20 is correctly positioned within the landing gear bay 1100 once installed. The spacing element 330 can be considered to be a shim, for example. The attachment system 100 may comprise a plurality of spacing elements 330 having different respective thicknesses, for example, such than an engineer can select an appropriately sized spacing element 330 for use in the installation.

Figure 4:
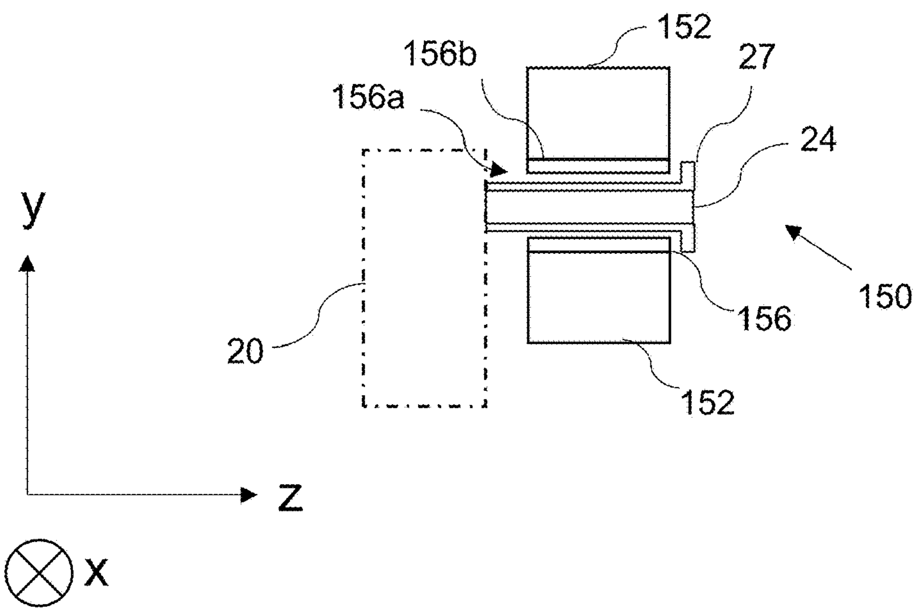
FIG. 4 shows a schematic view of the attachment system in a side-view, according to an embodiment of the present invention.

FIG. 4 schematically illustrates the attachment element 150 in side view. The pivot pin 24 may comprise a flared end 27 which prevents it from sliding out of the aperture 156a and bearing 156b as the flared end 27 is wider than the aperture 156a and contact surfaces of the body 152 if the pivot pin 24 is pulled in a direction out of the aperture 156a. The flared end 27 may be integrated within the pivot pin 24 itself, or may be a separate attachment attached to the end of the pivot pin 24 during the installation process. Accordingly, in some examples the attachment element 150 may be attached to the pivot pin 24 prior to the pivot pin 24 being attached to the landing gear 20.

Figure 5:
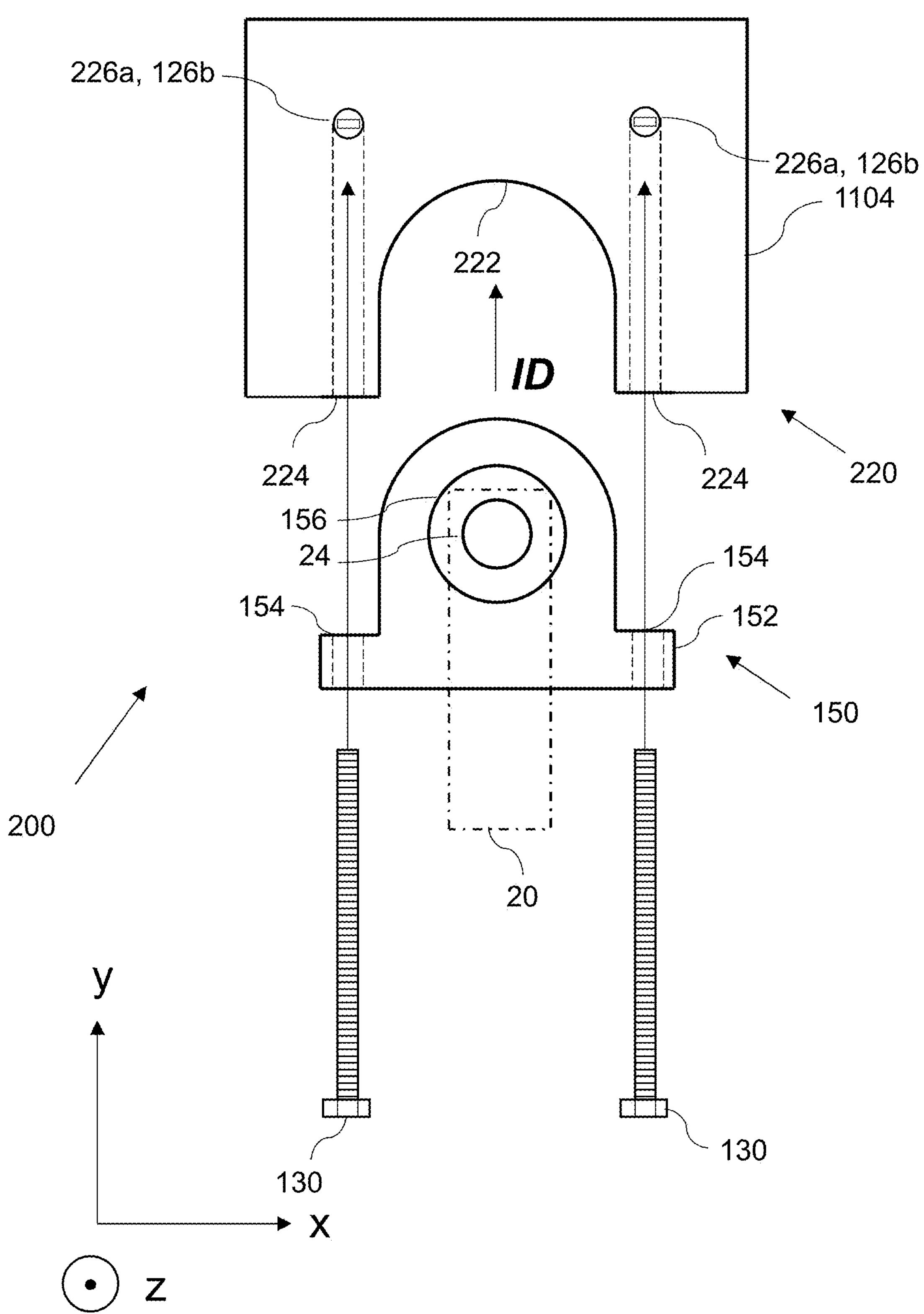
FIG. 5 shows a schematic view of an attachment system in a front view, according to a further embodiment of the present invention.

FIG. 5 illustrates the attachment system 100 in a front-on view according to a second embodiment. In the second embodiment, the receiving element, herein designated 220, is formed within a structural element of the landing gear bay 1100, designated 1104. The attachment element 150 may be the same as or substantially similar to those examples described for the first embodiment. Similarly, the structural element 1104 in which the receiving element 220 of the second embodiment is formed may correspond to the structural element 1102 to which the receiving element 120 of the first embodiment is attached. For example, both structural elements 1102, 1104 may be side panels of the landing gear bay.

In the second embodiment, a recess 222 is formed in the structure 1104 of the landing gear bay 1100. In this example, the structure 1104 is a side panel of the landing gear bay. The recess 222 is a mousehole formed in the structure 1104. In some examples, the structure 1104 is initially manufactured with the recess 222, whereas in other examples an existing structure 1104 is modified to include the recess 222. As described for the first embodiment, the recess 222 is complementary to the shape of the body 152 of the attachment element 150. Therefore, the recess 222 in this example is substantially arch-shaped, but in other examples may have other shapes according to the attachment element 150 with which it is to be used. The structure 1104 also comprises fastener receptacles 224 which are for receiving the fasteners 130 provided through the fastener receptacles 154 of the attachment element 150. Corresponding horizontal boreholes 226*a* and barrel nuts 126*b* are provided, the barrel nuts 126*b* for engaging with the fasteners 130.

Figures 6A, 6B:
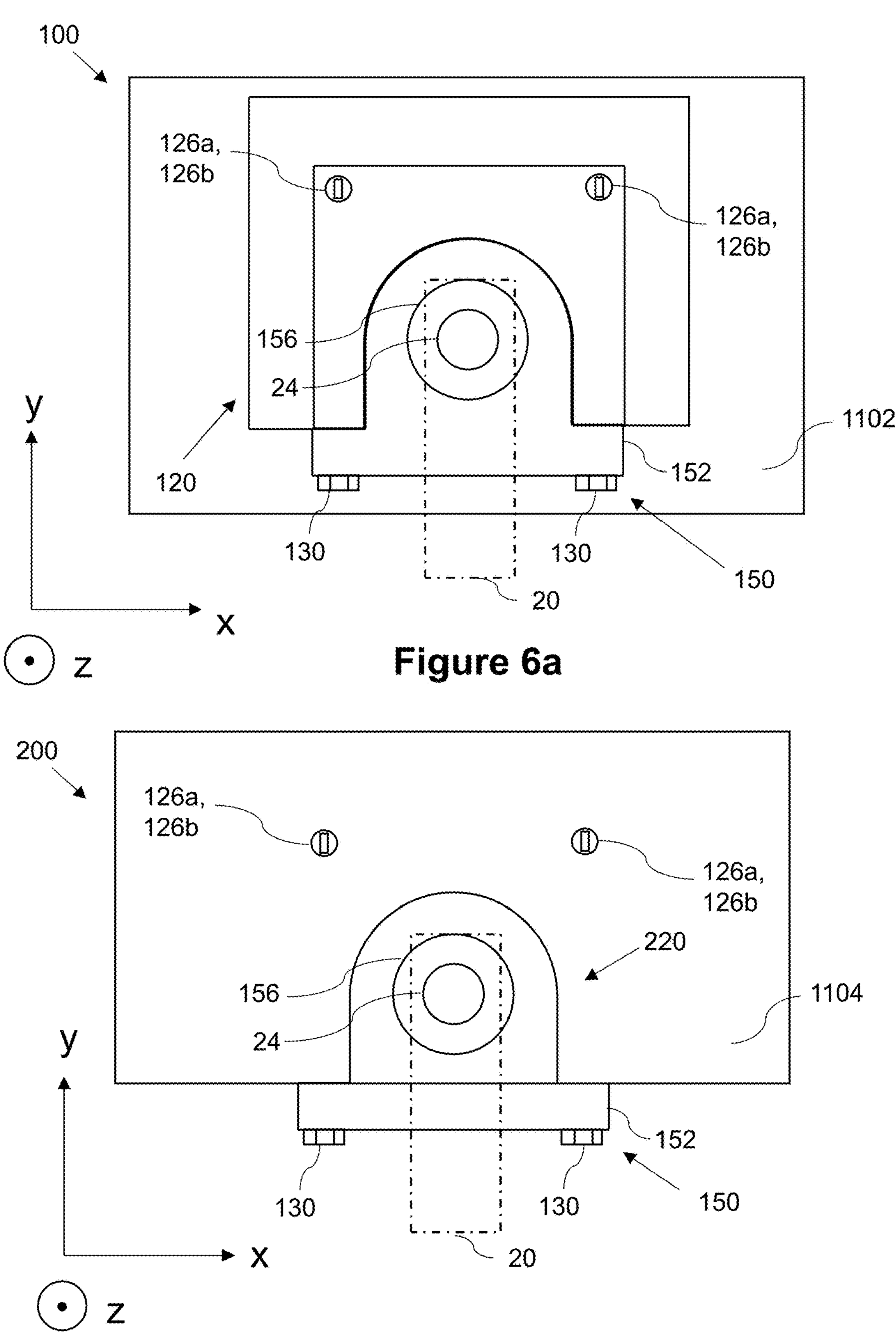
FIG. 6*a* shows a schematic view of an attachment system according to embodiments of the present invention.
FIG. 6*b* shows a schematic view of an attachment system according to embodiments of the present invention.

FIGS. 6*a* and 6*b*, respectively, schematically illustrate the attachment system 100 of the first embodiment, and the attachment system 200 of the second embodiment each in assembled form, with the attachment element 150 inserted into the receiving element 120, 220 and the fastener 130 fastened to secure the attachment element 150 to the receiving element 120, 220. In this way, the landing gear 20 is attached by the attachment system 100 to the structure 1102 of the landing gear bay 1100. Similarly, the landing gear 20 is attached by the attachment system 200 to the structure 1104 of the landing gear bay 1100. Once attached by either attachment system 100, 200, the landing gear 20 is movably coupled to the landing gear bay 1100 such that the landing gear 20 can be reoriented to allow for retraction into a stowed position in the landing gear bay 1100 and deployment from the landing gear bay 1100.

Figure 7B:
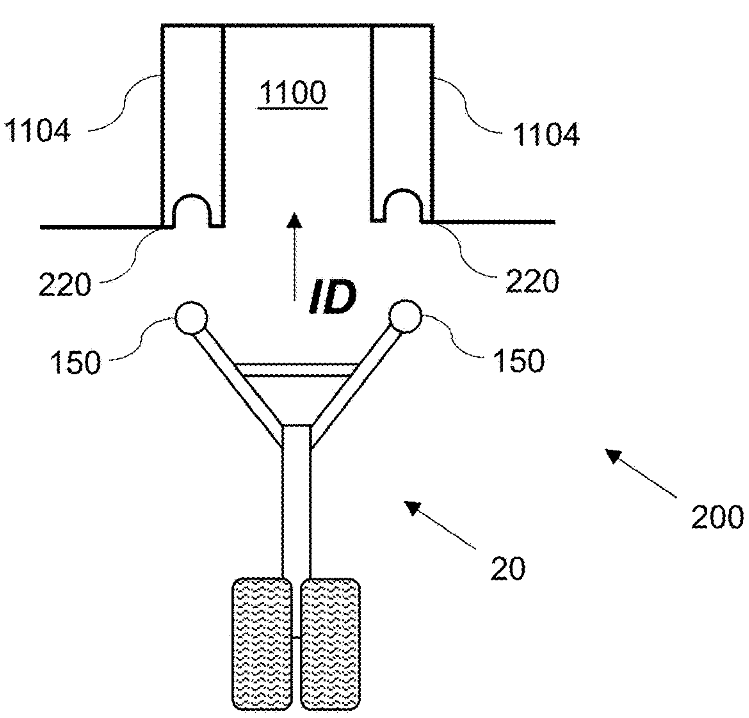
FIG. 7*b* shows a schematic view of an attachment system according to embodiments of the present invention.
Figure 7A:
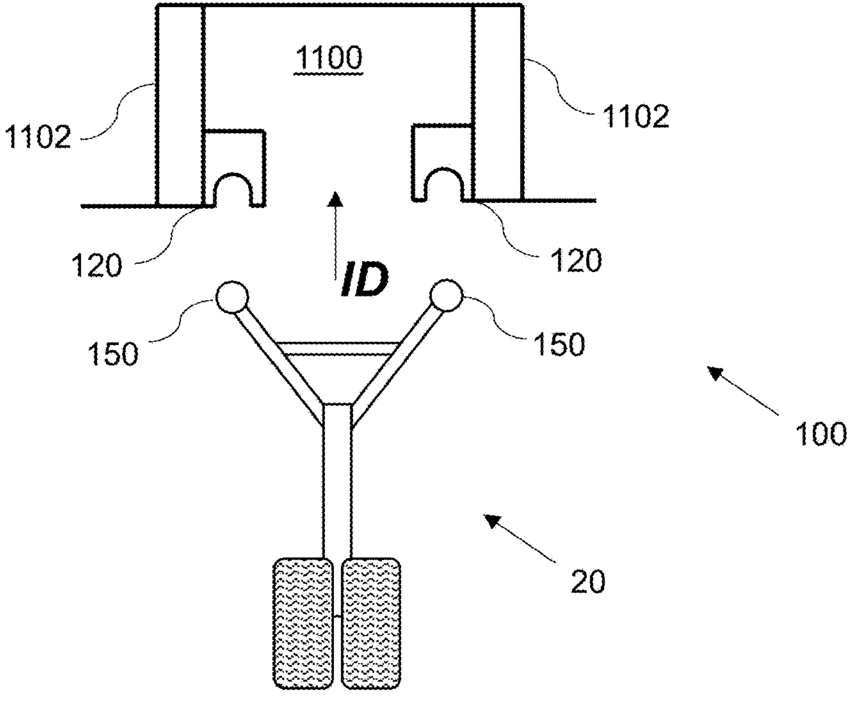
FIG. 7*a* shows a schematic view of an attachment system according to embodiments of the present invention.

FIGS. 7*a* and 7*b*, respectively, schematically illustrate the attachment system 100 of the first embodiment, and the attachment system 200 of the second embodiment, each within view of the landing gear bay 1100. Each embodiment can allow the installation of the landing gear 20 in the installation direction as the attachment element 150 is received by the receiving element 120, 220 in the installation direction, and subsequently fastened by the fastener 130 (not shown in FIG. 7). As described previously, the attachment system 100 of the first embodiment is attached to the structural element 1102 and protrudes into the landing gear bay 1100. As described previously, the attachment system 200 of the second embodiment is formed within the structural element 1104 and so the receiving element 220 may be aligned with the boundary of the landing gear bay. The structural element 1102 of the landing gear bay 1100 described for the first embodiment and structural element 1102 of the landing gear bay 1100 described for the second embodiment may otherwise be the same structural element, beyond the differences described previously. For example, both attachment systems 100, 200 may use a side panel of the landing gear bay 1100 as the structural element to which they are secured or formed in.

In examples, four attachment element and receiving element pairs are used to install a landing gear 20. For example, a first and second attachment element are attached to main fitting pintles of the landing gear, and a third and fourth attachment element are attached to dragstay pintles of the landing gear, each of which can be a portion 22 of the landing gear 20. First, second, third and fourth receiving elements are correspondingly positioned within the landing gear bay, either as per the first embodiment or as per the second embodiment. A mixture of receiving elements may be used, for example wherein the dragstay pintle attachment elements are received by receiving elements of the first embodiment and the main fitting pintle attachment elements are received by receiving elements of the second embodiment.

FIGS. 8*a-f* illustrate variations on the attachment element 150 and corresponding variations of the receiving element 120, 220. The variations are equally applicable to the first embodiment and the second embodiment. The skilled person will understand, upon reading the following description of the figures, how each described variation could be combined with the other described variations, such that the illustrated variations do not represent an exhaustive list but rather each highlights a particular feature which may be included in embodiments of the attachment system 100, 200. Accordingly, a "first" example here is labelled "first" in reference to the collection of variations depicted by FIGS. 8*a-f*, rather than being a first in the context of the entire description.

Figures 8A, 8B, 8C:
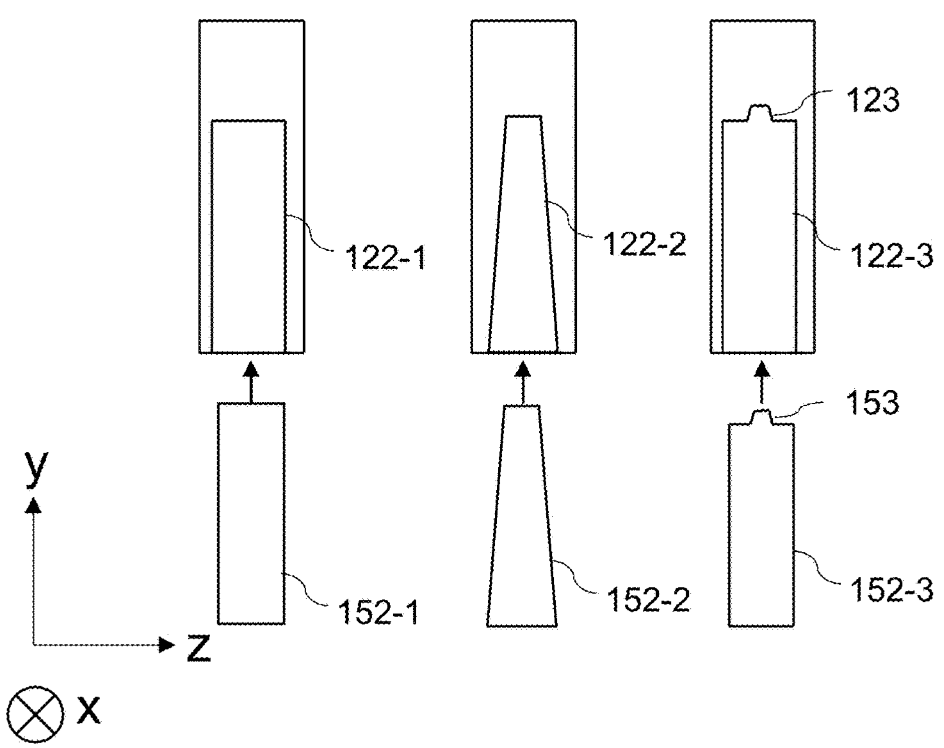
FIG. 8*a* shows a schematic view of an attachment element and a receiving elements according to embodiments of the present invention.
FIG. 8*b* shows a schematic view of an attachment element and a receiving elements according to embodiments of the present invention.
FIG. 8*c* shows a schematic view of an attachment element and a receiving elements according to embodiments of the present invention.

FIG. 8*a* illustrates a side-view of a first example of the attachment element body 152-1 in which the body 152-1 comprises parallel sides. That is, top and bottom sides of the body 152-1 are parallel, wherein top and bottom are in reference to the y-axis, or the installation direction. Similarly, front and back sides are parallel, wherein front and back is in reference to sides at different positions along the z-axis. Correspondingly, a first example of the recess 122-1 of the receiving element 120 also comprises parallel sides in the same cross-section, as the recess 122-1 has a complementary shape to the first example of the attachment element body 152-1.

FIG. 8*b* illustrates a side view of a second example of the attachment element body 152-2 in which the body 152-2 is tapered. For clarity, the entire body 152-2 is illustrated as being tapered in the cross-section presented by FIG. 8*b* but more generally, just a portion of the attachment element body 152-2 might be tapered. Relative to the y-axis, or the installation direction, a thickness of the entire body 152-2 relative to the z-axis, as measured between the front and back sides, decreases along the height of the attachment element body 152-2. The top of the attachment element body 152-2, the point highest on the z-axis and which can be considered to extend furthest into the recess 122 of the receiving element 120, is narrower than the bottom of the attachment element body 152-2. In other words, the attachment element body 152-2 comprises opposite sides which are not parallel. Correspondingly, a second example of the recess 122-2 comprises correspondingly drafted sides which are of complementary shape to the second example of the attachment element body 152-2.

Providing a taper in this manner can assist insertion of the attachment element 150 into the receiving element 120 because the top of the attachment element body 152-2 is narrower than an opening of the recess 122-2 into which the attachment element body 152-2 is inserted, which can make it easier to insert. Because the recess 122-2 is correspondingly drafted to the tapered attachment element body 152-2, once the attachment element 150 is fully inserted into the receiving element 120 a contacting interface is formed between recess 122-2 and the attachment element body 150-2. Forces can be transferred across this contacting interface.

Figures 8D, 8E, 8F:
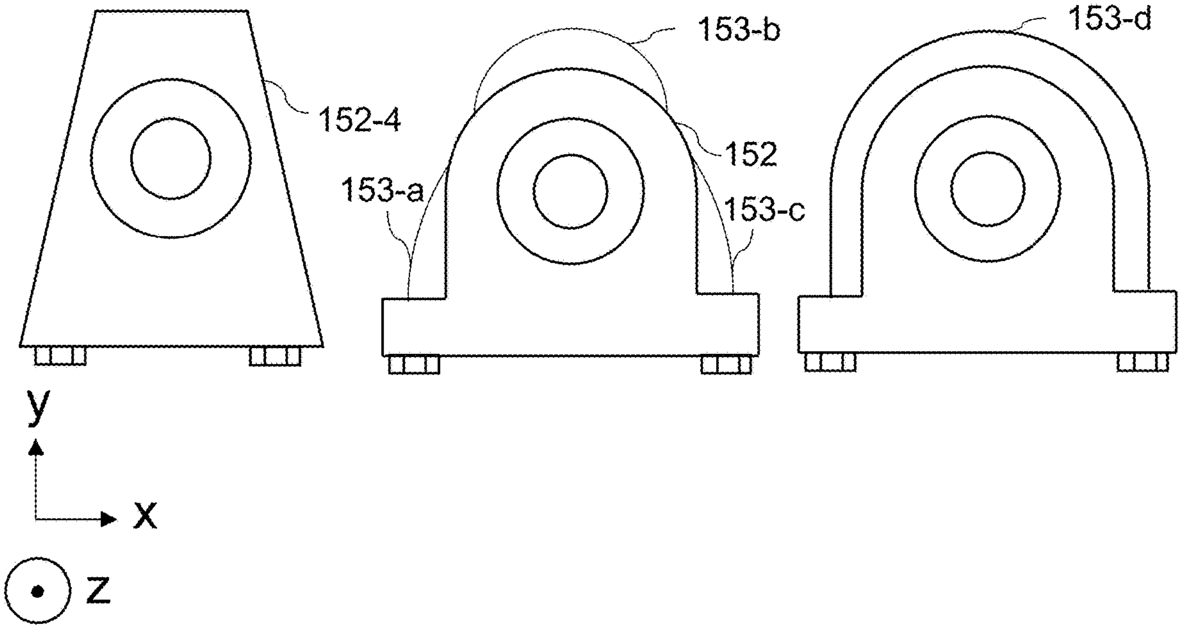
FIG. 8*d* shows a schematic view of an attachment element and a receiving elements according to embodiments of the present invention.
FIG. 8*e* shows a schematic view of an attachment element and a receiving elements according to embodiments of the present invention.
FIG. 8*f* shows a schematic view of an attachment element and a receiving elements according to embodiments of the present invention.

FIG. 8*c* illustrates a third example of an attachment element 150 in which the attachment element body 152-3 is provided with a flange 153. The flange is provided on the top surface of the attachment element body 152-3, but other variations are possible, as illustrated by FIGS. 8*e* and 8*f* and described shortly. In the example of FIG. 8*c*, the flange 153 is tapered, but in other examples it may comprise parallel sides. That is, similar to the tapered profile of the second example of attachment element body 152-2, in the y-direction, or the installation direction, the thickness of the flange 153 decreases, the thickness being in the front-back direction, or the z-direction. A third example of the recess 122-3 comprises a groove 123 which corresponds to the flange 153, such that when the attachment element body 152-3 is inserted into the recess 122-3, the flange 153 is received by the groove 123. The flange can further improve distribution of forces between the attachment element 150 and the receiving element 120 by reacting to lateral loads placed upon the attachment element, for example, and can also serve as a confirmation of proper insertion of the attachment element 150 within the receiving element 120 by ensuring the attachment element 150 is stood-off from the receiving element 120 until the flange 153 is inserted into the groove 123.

FIG. 8*d* illustrates a fourth example of an attachment element body 152-4 in front-on view. Compared to the examples illustrated in FIGS. 2-6, for example, the attachment element body 152-4 of FIG. 8*d* does not comprise a curved portion. Instead, the attachment element body 152-4 comprises a tapered profile in the front-on view. That is, the lateral sides, relative to the x-axis, are non-parallel and change in thickness relative to the height of the attachment element body 152-4. Similarly to the tapered profile described in FIG. 8*b*, towards the top of the attachment element body 152-4 the attachment element body 152-4 is thinner whilst towards the bottom of the attachment element 152-4 the attachment element body 152-4 is thicker, in this example in the direction of the x-axis. In examples the attachment element body 152 can be tapered in both the x-axis and the y-axis, in other words combining the features of FIG. 8*a* with FIG. 8*d*. Whilst not depicted in FIG. 8*d*, it will be appreciated that the receiving element is correspondingly drafted to be complementary with the tapered attachment element body 152-4.

FIG. 8*e* illustrates a fifth example of an attachment element 150 which comprises an attachment element body 152 substantially similar to that depicted in FIGS. 2-6, but comprising multiple flange portions 153*a*, 153*b*, 153*c*. The multiple flange portions are distributed around the external surface of the attachment element body 152. A first flange portion 153*a* is formed on a first lateral side of the attachment element body 152. A second flange portion 153*b* is formed on a top side of the attachment element body 152. A third flange portion 153*c* is formed on a second lateral side of the attachment element opposite the first lateral side, such that the attachment element body 152 is between the first flange portion 153*a* and the third flange portion 152*b*. The receiving element 120 (not pictured in FIG. 8*e*) comprises corresponding first, second and third grooves to respectively receive a flange portion 153*a-c*. In this configuration, the second flange portion 153*b* can be guided into position in its receiving groove as the first and third flange portions 153*a,c* are received by their respective grooves during insertion of the attachment element 150 into the receiving element 120. This can further improve the ease of installation. Once all flanges 153*a-c* are received by respective grooves, they can aid the transfer of loads between the attachment element and the receiving element. Additionally, in the example of FIG. 8*e*, each flange is itself curved in the x-y plane. This curve can further aid insertion of the flange into the groove in a similar manner to that described for the taper profile in FIGS. 8*b-d*. The curved flanges may, in examples, also comprise a taper profile in the back-front direction, for example.

FIG. 8*f* describes a fourth example of a flange 153-*d* which can be provided to the attachment element body 152. In this example, the flange is provided around a majority of the attachment element body 152, and can be thought of as providing a perimeter around the attachment element body 152.

Considering the shapes of the receiving element 120 and attachment element 150 more generally: in some examples, the recess of the receiving element is formed by surfaces in the x and z planes, such that an inserted attachment element is prevented from movement in x and z directions by the surrounding recess surfaces. In other words, the receiving element encapsulates the attachment element in x and z directions when inserted, such as the examples illustrated in FIGS. 8*a*-8*c*. However, in other examples the front and back sides of the attachment element are flush with front and back sides of the receiving element, such as that visible in the cross-section of FIG. 11*b*. That is, the front and back sides of the attachment element are aligned with the front and back sides of the attachment element relative to the z axis. In such examples, motion in the z-axis can be prevented by the presence of flanges and grooves which are located more internally to the recess and attachment element, as described for FIGS. 8*c*, 8*e* and 8*f*. Having flush front and back surfaces of the receiving element and attachment element can reduce a spatial footprint of the attachment system in the z-direction, for example, which can increase space available in the landing gear bay 1100.

Figure 9:
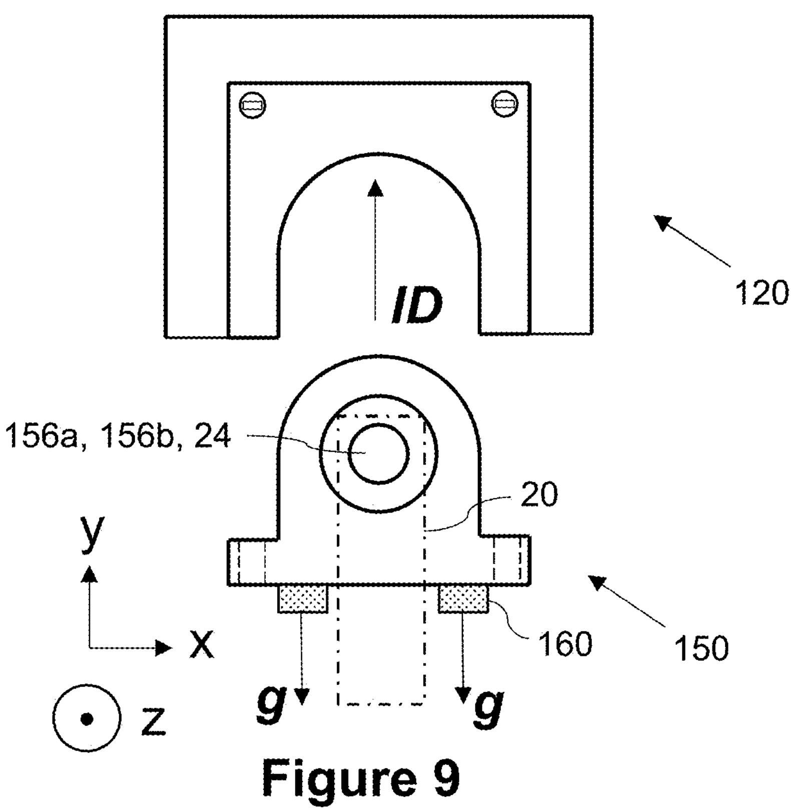
FIG. 9 shows a schematic view of a guidance element and a retaining element according to embodiments of the present invention.
Figure 10:
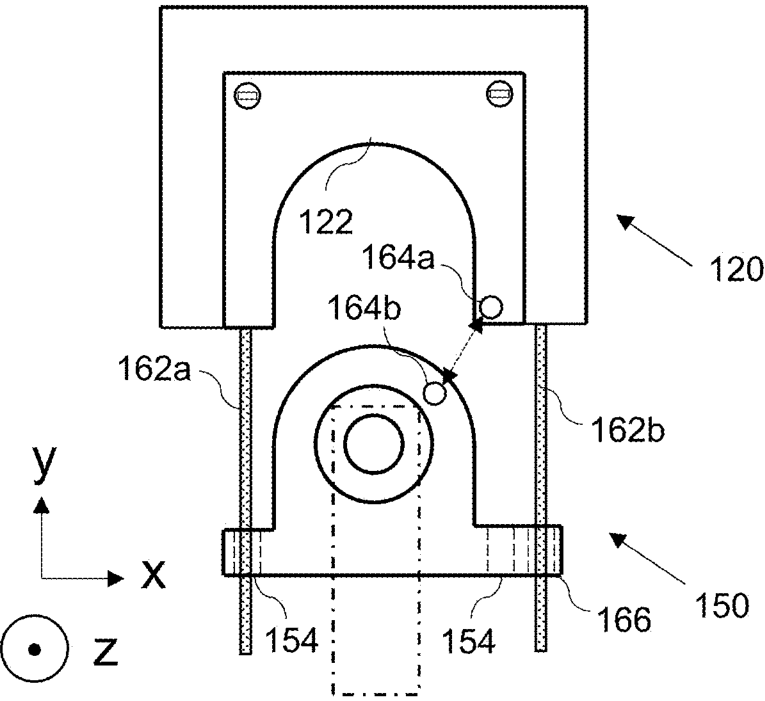
FIG. 10 shows a schematic view of a guidance element and a retaining element according to embodiments of the present invention.

FIGS. 9 and 10 illustrate additional elements which, in examples, may be provided within the attachment system 100, 200 to assist in the installation of the landing gear 20.

In FIG. 9, counterweight elements 160 are provided on the attachment element 150. The attachment element 150, in being movably coupled to the landing gear 20 by the pivot pin 24, may experience reorientation during installation of the landing gear 20, such as when the landing gear 20 is lifted into the landing gear bay 1100. The counterweight elements 160 are provided to reduce or prevent reorientation of the attachment element 150 and thereby ensure that the attachment element 150 is straightforwardly received by the receiving element 120. For example, the counterweight elements 160 may be provided below the coupling point formed by pivot pin 24, bearing 156*b* and aperture 156*a* of the attachment element 150. This can lower the center of mass of the attachment element 150 and increase the mass of the attachment element 150 to thereby increase a period of oscillation of the attachment element 150, improving its stability during the installation process. More generally, the counterweight elements 160, in being provided on the attachment element 150 and being pulled downwards by gravity, indicated by arrow g, can thereby ensure the attachment element is correctly oriented relative to the installation direction, even given that the attachment element is movably connected to the landing gear 20.

The counterweight elements 160 can be considered to be retaining elements, which retain the components of the attachment system within an orientation such that the attachment element 150 is insertable within the receiving element 120. In other examples, other examples of retaining elements may be additionally or alternatively provided. For example, a spring may be attached between the landing gear 20 and the attachment element 150. The spring, in being compressible and expandible, allows for a degree of movement of the attachment element 150 relative to the landing gear 20, but returns the attachment element 150 to a neutral position, which can be arranged to align with the receiving element 120. This can allow for small adjustments for the attachment element 150 during insertion into the receiving element 120, whilst preventing or resisting larger reorientations which would prevent insertion of the attachment element 150 into the receiving element 120.

In FIG. 10, two examples of guidance elements are illustrated.

A pair of magnets 164*a*, 164*b* are provided in the example of FIG. 10. In the example of FIG. 10, a first magnet 164*a* of the pair is provided on the receiving element 120, and a second magnet 164*b* of the pair is provided on the attachment element 150. The first magnet 164*a* is provided towards the opening of the recess 122 and the second magnet 164*b* is provided on the top of the attachment element 150 such that, as the attachment element 150 approaches the receiving element 120 for insertion, the first magnet and the second magnet attract one another and thereby help guide the attachment element 150 into the receiving element 120. In other examples, there may be only one permanent magnet provided, and it may be used to attract a magnetic material on the corresponding element, for example. For example, a magnet may be provided on the receiving element, whilst the attachment element comprises a paramagnetic material for attraction to the magnet.

A pair of guidance rods 162*a*, 162*b* are provided in the example of FIG. 10. The guidance rods 162*a*, 162*b* are attached to the receiving element 120 and extend in a vertical direction, that is in the y-direction, or in the direction of installation. For explanatory purposes, two example configurations of the guidance rods are presented here. The first guidance rod 162*a* is positioned such that it can received by the fastener receptacle 154. Once received by the fastener receptacle 154, the guidance rod 162*a* acts to guide the attachment element 150 to insertion into the receiving element 120. The first guidance rod 162*a* is removable, such that once the guidance element 150 is inserted into the receiving element 120, the guidance rod 162 can be removed and replaced by the fastener 130 to fasten the attachment element 150 to the receiving element 120. The second guidance rod 162*b* is positioned such that it can be received by a dedicated guidance rod receptacle 166 provided on the attachment element 150. The second guidance rod 162*b* may also be temporary, being removed once the attachment element 150 is inserted into the receiving element 120, or may be permanent, and serve the sole purpose of guiding the attachment element 150 into the receiving element 120, for example, but remaining in place once inserted.

In further examples, magnets may be provided to the guidance rods and the receptacles, for example, to aid insertion of the guidance rods through their respective receptacles.

Figure 11A:
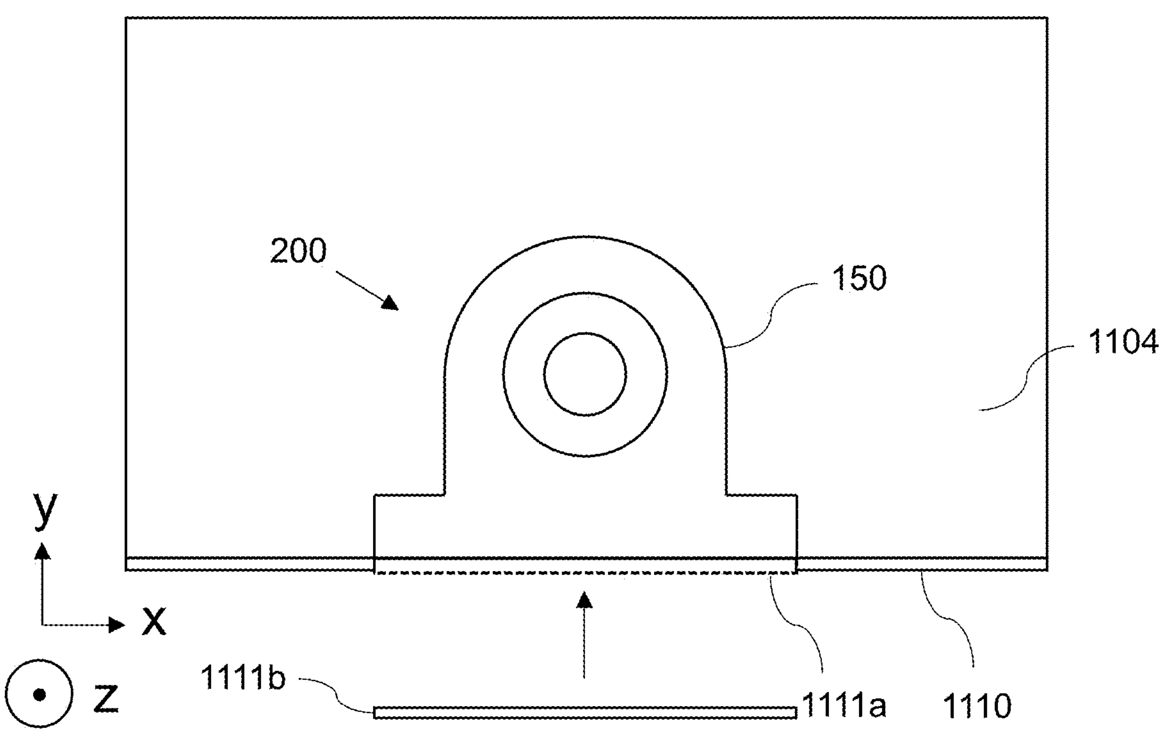
FIG. 11*a* shows a schematic view of the aircraft skin and an attachment system according to an embodiment of the present invention.
Figure 11B:
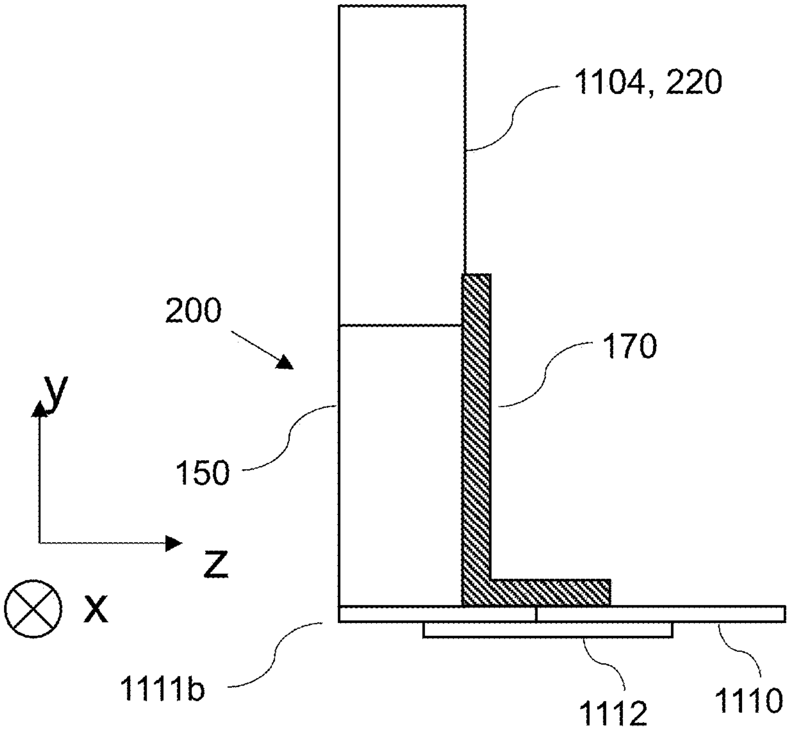
FIG. 11*b* shows a schematic view of the aircraft skin and an attachment system according to an embodiment of the present invention; and, FIG. 12 illustrates an aircraft comprising the attachment system of the present invention.

FIGS. 11*a* and 11*b* illustrate further features which may be provided to the attachment system 200 of the second embodiment. It will be appreciated that, in examples, providing the receiving element 120 directly within a structural element 1104 of the landing gear bay 1100 may disrupt the external aircraft skin 1110. In the example of FIGS. 11*a* and 11*b*, a portion of the aircraft skin 1111*a* has been removed such that the attachment element 150 can be inserted into the receiving element 120. Accordingly, a replacement aircraft skin portion 1111*b* is provided after insertion of the attachment element 150 into the receiving element 120. The replacement aircraft skin portion 1111*b* is attached to the bottom of the attachment element 150 such that the replacement aircraft skin portion 1111*b* is coplanar with the external aircraft skin 1110. This can improve the aerodynamic performance of the aircraft around the landing gear bay area. A skin doubler 1112 can be provided to further reinforce the replacement aircraft skin portion 1111*b*. A load transfer cap 170 can be provided to be fastened to and transfer load between any of the external aircraft skin 1110, and replacement aircraft skin portion 1111*b*, and the structural element 1104 and the attachment element 150.

More generally, the attachment system may comprise other components for local reinforcement of the surrounding structures, for example other structural elements of the landing gear bay, the aircraft exterior skin, or a combination thereof.

The receiving element 120 and attachment element 150 may be formed of metal or composite materials, for example. In some embodiments, the structural element 1102, 1104 of the landing gear bay 1100 is also formed from the same metal or composite materials.

Figure 12:
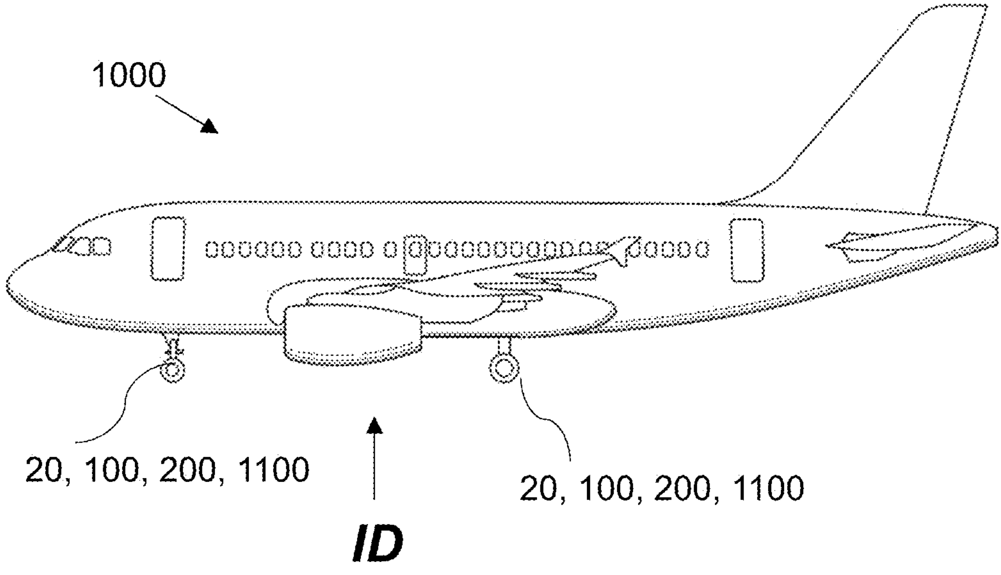

FIG. 12 illustrates the aircraft 1000 comprising the landing gear 20 installed into the landing gear bay 1100 by the attachment system 100, 200 described herein. The aircraft 1000, in comprising the attachment systems 100, 200, can be manufactured more quickly due to the decreased complexity of the installation process. Furthermore, should maintenance of the aircraft 1000 be required.

In examples, the attachment system 100, 200 is provided in the nose landing gear of the aircraft and the attachment system 100, 200 is attached to side panels of the nose landing gear bay, or the receiving element 220 is formed within side panels of the nose landing gear bay.

The attachment system 100, 200 described herein may be provided as a kit of parts, for example, and attachment elements may be provided separately to receiving elements, for example. For example, different attachment elements may be used with a receiving element, and different receiving elements may be used with an attachment element. This can allow an attachment or receiving element to be chosen based on the landing gear or aircraft, for example. Providing the attachment and receiving element separately can allow for replacement attachment or receiving elements to be provided for maintenance purposes, for example.

Above embodiments are to be understood as an illustrative example of the invention. Further embodiments of the invention are envisaged:

For example, in the above examples, the fasteners for fastening the attachment element to the receiving element have been in the form of a bolt passing through the attachment element and engaging a barrel nut provided in the receiving element. The skilled person will appreciate that other fasteners may be provided which are similar installable and securable in the installation direction.

In the above examples, the fasteners have been provided in the installation direction. However, this does not preclude other fasteners being provided, for example once the attachment element is initially secured by the receiving element, to reinforce the aforementioned fasteners provided in the installation direction.

It is be understood that any feature described in relation to any one embodiment may be used alone, or in combination with other features described, and may also be used in combination with one or more features of any other of the embodiments, or any combination of any other embodiments. Furthermore, equivalents and modifications not described above may also be employed without departing from the scope of the invention, which is defined in the accompanying claims.

It is to be noted that the term “or” as used herein is to be interpreted to mean “and/or”, unless expressly stated otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An attachment system for installing a landing gear into a landing gear bay of an aircraft, the attachment system comprising:

an attachment element configured to be attached to a pivot pin of the landing gear, the pivot pin forming a rotational coupling between the landing gear and the attachment element, the pivot pin having a longitudinal axis extending in a horizontal orientation; and a receiving element configured to receive the attachment element when attached to the pivot pin, and to secure the landing gear within the landing gear bay; wherein the receiving element is configured such that the attachment element is insertable into the receiving element in an installation direction, and the attachment element is configured to receive, along the installation direction, a fastener to fasten the attachment element to the receiving element, wherein the fastener has a longitudinal axis that is angled at an angle greater than 45 degrees with respect to the longitudinal axis of the pivot pin.

2. The attachment system of claim 1, wherein the attachment element comprises a tapered portion configured to be inserted into a corresponding drafted portion of the receiving element.

3. The attachment system of claim 1, wherein the attachment element comprises a curved portion and the receiving element comprises a corresponding curved portion.

4. The attachment system of claim 3, wherein the curved portion of the attachment element is semicircular.

5. The attachment system of claim 1, wherein the attachment element comprises a flange and the receiving element comprises a corresponding groove for receiving the flange, the flange and the corresponding groove configured to distribute forces between the attachment element and the receiving element.

6. The attachment system of claim 1, wherein the attachment element further comprises a bearing element for receiving the pivot pin of the landing gear.

7. The attachment system of claim 1, wherein the receiving element is attached to a structural element of the landing gear bay.

8. The attachment system of claim 7, wherein the structural element of the landing gear bay is a side panel of the landing gear bay.

9. The attachment system of claim 7, wherein the receiving element comprises: a surface for counterboring for fastening the receiving element to the structural element of the landing gear bay; or a spacing element disposable between the receiving element and the structural element of the landing gear bay; or both.

10. The attachment system of claim 1, wherein the receiving element is formed within a structural element of the landing gear bay.

11. The attachment system of claim 10, wherein the structural element of the landing gear bay is a side panel of the landing gear bay.

12. The attachment of system of claim 11, further comprising an aircraft skin portion attached to the attachment element such that, when the attachment element is received by the receiving element, the aircraft skin portion is coplanar with an exterior skin of the aircraft.

13. The attachment system of claim 12, further comprising a load transfer cap attached between the aircraft skin portion and the structural element of the landing gear bay and configured to distribute a load between the aircraft skin portion and the structural element of the landing gear bay.

14. The attachment system of claim 7, wherein the attachment element, the receiving element, and the structural element of the landing gear bay are each formed of a same material.

15. The attachment system of claim 1, further comprising a retaining element configured to retain the attachment element in an installation orientation relative to the landing gear.

16. The attachment system of claim 15, wherein the retaining element is a weight disposed in the attachment element and configured to retain the attachment element in a vertical orientation.

17. The attachment system of claim 1, wherein the installation direction extends vertically through an opening of the landing gear bay.

18. The attachment system of claim 1, further comprising a guidance element disposed on at least one of the attachment element and the receiving element and configured to aid movement of the attachment element along the installation direction.

19. An aircraft comprising:

the attachment system of claim 1.

20. The attachment system of claim 1, wherein, when received, the fastener passes through the attachment element before passing through the receiving element.

21. An attachment element for installing a landing gear into a landing gear bay of an aircraft, the attachment element comprising:

a body configured to attach to a pivot pin of the landing gear, the pivot pin having a longitudinal axis extending in a horizontal orientation and the pivot pin forming a rotational coupling between the landing gear and the attachment element, the body further configured to be inserted, in an installation direction, into a receiving element of the landing gear bay; and a receptacle for a fastener for fastening the body to the receiving element;

wherein the receptacle is configured to receive the fastener from the installation direction, wherein the fastener has a longitudinal axis that is angled at an angle greater than 45 degrees with respect to the longitudinal axis of the pivot pin.

* * * * *